(12) United States Patent
Cosentino et al.

(10) Patent No.: US 12,481,447 B1
(45) Date of Patent: Nov. 25, 2025

(54) CLOUD TO ON-PREMISES STORAGE MIGRATION

(71) Applicant: Red Hat, Inc., Raleigh, NC (US)

(72) Inventors: Andrea Cosentino, Milan (IT); Leigh Griffin, Waterford (IE); Paolo Antinori, Waterford (IT)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 18/671,608

(22) Filed: May 22, 2024

(51) Int. Cl.
*G06F 3/06* (2006.01)
(52) U.S. Cl.
CPC .......... *G06F 3/0647* (2013.01); *G06F 3/0607* (2013.01); *G06F 3/067* (2013.01)
(58) Field of Classification Search
CPC ....... G06F 3/0647; G06F 3/0607; G06F 3/067
See application file for complete search history.

(56) References Cited

U.S. PATENT DOCUMENTS 9,798,486 B1 * 10/2017 Singh .................. G06F 11/1453

* cited by examiner

*Primary Examiner* — Chie Yew
(74) *Attorney, Agent, or Firm* — Womble Bond Dickinson (US) LLP

(57) ABSTRACT

Embodiments of the present disclosure relate to migrating data from the cloud to on-premises storage. More specifically, a processing device obtains an indication of a plurality of cloud storage resources associated with a plurality of cloud storage providers and a plurality of geographic regions. The processing device generates an on-premises file structure based on the indication of the plurality of cloud storage resources and the plurality of geographic regions. The processing device migrates the plurality of cloud storage resources to on-premises storage based on the on-premises file structure.

20 Claims, 7 Drawing Sheets

CLOUD TO ON-PREMISES STORAGE MIGRATION

TECHNICAL FIELD

Aspects of the present disclosure relate to cloud computing, and more particularly, to migrating data from the cloud to on-premises storage.

BACKGROUND

Cloud computing refers to a paradigm by which computing services/resources, such as servers, storage, databases, networking, software, analytics, and intelligence, are delivered over the Internet to user devices. Cloud computing may be characterized by on-demand self-service (i.e., the cloud can automatically provision resources without human interaction with a service provider), broad network access (i.e., the cloud can be accessed by different devices with varying capabilities, such as mobile phones, tablets, smartphones, laptops, and workstations), resource pooling (i.e., the cloud can serve multiple different clients), rapid elasticity (i.e., the cloud can dynamically scale computing resources both upwards and downwards based on needs of clients), and measured service (i.e., the cloud monitors computing resources used by clients). Some clouds may be distributed over multiple centers across disperse geographic locations. Compared to other types of computing paradigms, cloud computing may provide various advantages to clients, such as scalability, performance increases, device independence, decreased maintenance, and increased availability.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
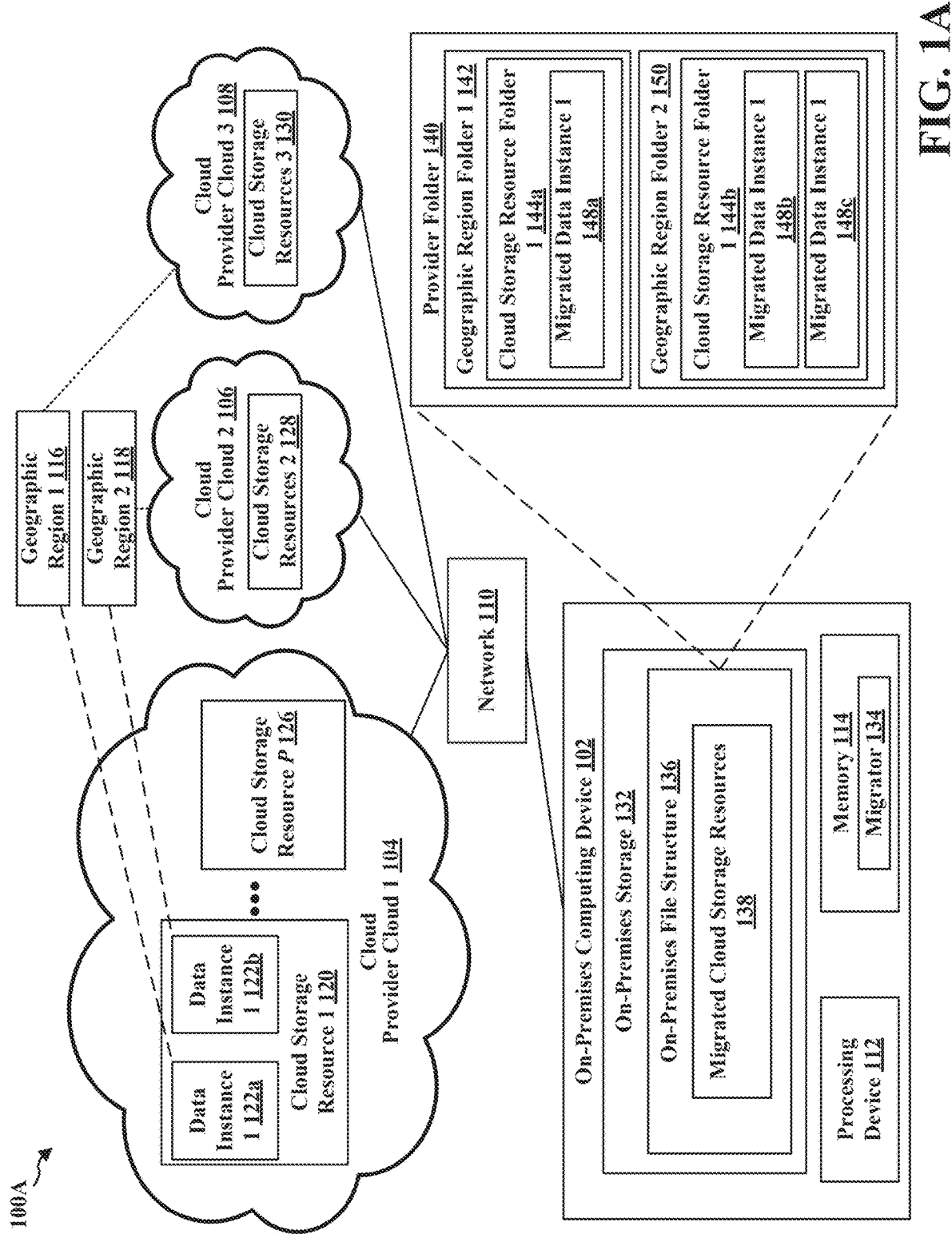
FIG. 1A is a block diagram that illustrates an example system in accordance with some aspects of the present disclosure.

Cloud computing refers to a paradigm by which computing services/resources, such as servers, storage, databases, networking, software, analytics, and intelligence, are delivered over the Internet to user devices. Cloud computing may be characterized by on-demand self-service (i.e., the cloud can automatically provision resources without human interaction with a service provider), broad network access (i.e., the cloud can be accessed by different devices with varying capabilities, such as mobile phones, tablets, smartphones, laptops, and workstations), resource pooling (i.e., the cloud can serve multiple different clients), rapid elasticity (i.e., the cloud can dynamically scale computing resources both upwards and downwards based on needs of clients), and measured service (i.e., the cloud monitors computing resources used by clients). Some clouds may be distributed over multiple data centers across disperse geographical locations. For example, a first data center of a cloud provider at a first geographic location (e.g., North America) may store a first instance of a data and a second data center of the cloud provider at a second geographic location (e.g., Europe) may store a second instance of the data. Compared to other types of computing paradigms, cloud computing may provide various advantages to clients, such as scalability, performance increases, device independence, decreased maintenance, and increased availability.

Different cloud providers may provide cloud computing services (i.e., "clouds") to client devices of clients (e.g., organizations). Example cloud providers include Amazon Web Services™ (AWS™), Google Cloud™, and Microsoft Azure™. Different cloud providers may utilize different data structures (e.g., buckets, blogs, etc.) and/or different commands in order to store, access, and manipulate data stored in cloud storage. For example, some cloud providers may utilize object-based storage in which data is manipulated into objects stored in a flat environment, whereas other cloud providers may utilize a hierarchical-based storage in which data is stored in a hierarchy (e.g., folders). The different data structures and/or different commands may be based on an underlying structure of the clouds provided by the cloud service providers. Furthermore, the different data structures and/or commands may be based on geographic regions at which the different data structures are stored and/or at which the commands are executed.

While cloud computing is able to offer certain technical advantages to clients, in some cases, a client (e.g., an organization) may wish to "migrate away" from the cloud, that is, the client may seek to move data stored in cloud storage of a cloud provider to on-premises storage (e.g., to a server managed by the client). In one example, the client may wish to migrate data away from the cloud to on-premises storage in order to reduce costs associated with cloud computing. In another example, the client may wish to migrate data away from the cloud to on-premises storage in order to reduce latency associated with accessing the data over the Internet. In a further example, the client may wish to migrate data away from the cloud to on-premises storage in order to comply with policies of an organization and/or laws of a jurisdiction. For example, a data policy of an organization may dictate that certain data be stored in a particular country. In yet another example, the client may wish to migrate data away from the cloud to on-premises storage for data security reasons and/or privacy reasons.

As noted above, different cloud providers (which may also be referred to as cloud service providers or cloud storage providers) may utilize different data structures and/or different commands in order to store, access, and manipulate data stored in cloud storage. The data structures and commands utilized by cloud providers may be different from data structures and/or commands used to access data in a non-cloud computing environment (e.g., a server managed and maintained by an organization on the premises of the organization) due to differences between cloud computing environments and non-cloud computing environments. Such differences may cause issues when migrating data from cloud storage to on-premises storage. For example, a data instance may be stored in different instances of cloud storage associated with different geographic locations. When the data instance is migrated from the cloud storage to on-premises storage, the data instance may be inadvertently duplicated, which may cause access issues with the data instance and/or may result in an inefficient use of resources of the on-premises storage. In a contrasting example, a data instance may be stored in different instances of cloud storage associated with different geographic locations. When the data instance is migrated from the cloud storage to on-premises storage, only one instance of the data may be transferred. This may cause issues, as some applications may reference the data instance based on an associated geographic location of the data instance. If the data instance is stored as a single data instance that does not reflect the different geographic locations, certain applications that utilize the data instance may cease to function. In another example, security policies and/or access policies of data stored in the cloud may not be compatible with security policies and/or access policies of a non-cloud computing environment, which may cause issues when the data is migrated. In a further example, data may inadvertently fail to be transferred during the migration due to the differences between cloud computing environments and non-cloud computing environments. Furthermore, in some scenarios, a client may store data with multiple different cloud service providers utilizing disparate storage paradigms. The disparate storage paradigms may cause issues (e.g., access issues) when the data is migrated from the multiple different cloud service providers to on-premises storage of the client.

The present disclosure addresses the above-noted and other deficiencies by using a processing device to migrate data from the cloud to on-premises storage. In an example, the processing device obtains an indication of a plurality of cloud storage resources associated with a plurality of cloud storage providers and a plurality of geographic regions. The processing device generates an on-premises file structure based on the indication of the plurality of cloud storage resources and the plurality of geographic regions. The processing device migrates the plurality of cloud storage resources to on-premises storage based on the on-premises file structure. The above-described technologies may be associated with various technical advantages. For example, vis-à-vis generating an on-premises file structure based on the indication of the plurality of cloud storage resources and the plurality of geographic regions, the processing device may migrate cloud storage resources to the on-premises storage in a manner that mirrors a structure of the plurality of cloud storage resources in the cloud, but that is compatible with and accessible by computing devices of an organization that maintains the on-premises storage. For instance, mistaken duplication of data structures arising from the same data being stored as different data instances at different locations may be avoided, which may conserve resources of the on-premises storage.

In some aspects, the processing device additionally determines priorities of data instances stored in the plurality of cloud storage resources (e.g., based on metadata of the data instances, traffic monitoring of the data instances, etc.). The processing device assigns, to the data instances, labels from amongst a plurality of labels based on the determined priorities. When migrating the plurality of cloud resources to the on-premises storage, the processing device copies the data instances to storage devices of the on-premises storage based on the assigned labels and storage characteristics of the storage device. For example, the processing device may copy a first data instance having a first label that indicates that the first data instance is accessed relatively frequently to a first storage device associated with relatively fast read times (e.g., a solid-state drive (SSD)), whereas the processing device may copy a second data instance having a second label that indicates that the second data instance is accessed relatively infrequently to a second storage device associated with relatively slow read times (e.g., a tape drive). Thus, vis-à-vis assigning, to the data instances, labels from amongst a plurality of labels based on the determined priorities, the processing device may recreate a storage elasticity of the cloud storage providers in on-premises storage.

In some aspects, the processing device additionally determines a plurality of access policies of the plurality of cloud storage resources via a plurality of application programming interfaces (APIs) associated with the plurality of cloud storage providers. The processing device implements the plurality of access policies for the migrated plurality of cloud storage resources based on the on-premises file structure. Thus, vis-à-vis implementing the plurality of access policies for the migrated plurality of cloud storage resources based on the on-premises file structure, the processing device may facilitate seamless access to the migrated plurality of cloud storage resources stored in the on-premises storage.

FIG. 1A is a block diagram 100A that illustrates an example system. As illustrated in FIG. 1A, the system includes an on-premises computing device 102, a first cloud provider cloud 104, a second cloud provider cloud 106, a third cloud provider cloud 108, and a network 110. The first cloud provider cloud 104, the second cloud provider cloud 106, and the third cloud provider cloud 108 may be collectively referred to as "cloud provider clouds 104-108" or as a plurality of cloud provider clouds. Each cloud provider cloud in the cloud provider clouds 104-108 may be implemented as a group of computing devices (not depicted in FIG. 1A) under control of an organization. For example, a first organization (i.e., a first cloud provider) may control the first cloud provider cloud 104, a second organization (i.e., a second cloud provider) may control the second cloud provider cloud 106, and a third organization (i.e., a third cloud provider) may control the third cloud provider cloud 108. A computing device in the cloud provider clouds 104-108 may include elements such as a processor, a memory, a storage device, a network interface device, etc. In an example, one or more of the cloud providers are public cloud providers. In another example, one or more of the cloud providers are private cloud providers. In an example, each cloud provider cloud in the cloud provider clouds 104-108 may be implemented as one or more data centers. Although the block diagram 100A depicts three cloud providers, the technologies described herein may be applicable to any number of cloud provider clouds (e.g., one, four, ten, etc.). In an example, the first cloud provider cloud 104 and the third cloud provider cloud 108 may be associated with (e.g., located at, serve computing devices at, etc.) a first geographic region 116 (e.g., Europe) and the second cloud provider cloud 106 may be associated with a second geographic region 118 (e.g., North America).

The on-premises computing device 102 and the cloud provider clouds 104-108 may be coupled to each other (e.g., may be operatively coupled, communicatively coupled, may communicate data/messages with each other) via the network 110. The network 110 may be a public network (e.g., the Internet), a private network (e.g., a local area network (LAN) or wide area network (WAN)), or a combination thereof. In one example, the network 110 may include a wired or a wireless infrastructure, which may be provided by one or more wireless communications systems, such as a WiFi™ hotspot connected with the network 110 and/or a wireless carrier system that can be implemented using various data processing equipment, communication towers (e.g., cell towers), etc. The network 110 may carry communications (e.g., data, message, packets, frames, etc.) between the on-premises computing device 102 and the cloud provider clouds 104-108. The on-premises computing device 102 may include hardware such as a processing device 112 (e.g., processors, central processing units (CPUs)), memory 114 (e.g., random access memory (RAM), storage devices (e.g., a hard-disk drive (HDD)), a solid-state drive (SSD), etc.), and other hardware devices (e.g., a sound card, video card, etc.). A storage device may include a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed plurality of devices.

The on-premises computing device 102 may include any suitable type of computing device or machine that has a programmable processor including, for example, server computers, desktop computers, laptop computers, tablet computers, smartphones, set-top boxes, etc. In some examples, the on-premises computing device 102 may include a single machine or may include multiple interconnected machines (e.g., multiple servers configured in a cluster). For example, the on-premises computing device 102 may be a collection of machines under control of an organization. The on-premises computing device 102 may be implemented by a common entity/organization or may be implemented by different entities/organizations. The on-premises computing device 102 may execute or include an operating system (OS), as discussed in more detail below. The OS of the on-premises computing device 102 may manage the execution of other components (e.g., software, applications, etc.) and/or may manage access to the hardware (e.g., processors, memory, storage devices, etc.) of the on-premises computing device 102. In an example, the on-premises computing device 102 is controlled/managed by an entity (e.g., an organization) that wishes to migrate away from the cloud.

The first cloud provider cloud 104 (e.g., a group of computing devices) may include or be associated with a first cloud storage resource 120. The first cloud storage resource 120 may be or include a data structure. In an example, the first cloud storage resource 120 is an object-based storage resource or a hierarchical-based storage resource. In another example, the first cloud storage resource 120 is a bucket or a blob. The first cloud storage resource 120 may store/include a first data instance 122a. In an example, the first data instance 122a may be or include an image, data (e.g., spreadsheets, documents, etc.) of an organization which controls the on-premises computing device 102, etc. The first cloud storage resource 120 and the first data instance 122a may be accessed by and/or manipulated by a client device (e.g., the on-premises computing device 102, another device, etc.) via an application programming interface (API) defined by the first cloud provider which controls the first cloud provider cloud 104. The first cloud storage resource 120 (and hence the first data instance 122a) may be stored in computer-readable storage of the first cloud provider cloud 104. The first cloud provider cloud 104 may also include a Pth cloud storage resource 126, where P is a positive integer greater than one. The Pth cloud storage resource 126 may store data instance(s) (not depicted in FIG. 1A).

In an example, the first cloud storage resource 120 is a multi-regional cloud storage resource. For instance, the first data instance 122a may be associated with the first geographic region 116 (e.g., Central Europe), that is, the first data instance 122a may be stored in computer-readable storage located in the first geographic region 116. The first cloud storage resource 120 may also include a first data instance 122b that is associated with the second geographic region 118 (e.g., Western Europe), that is, the first data instance 122b may be stored in computer-readable storage located in the second geographic region 118. The first data instance 122a and the first data instance 122b may be copies of one another. For instance, the first data instance 122a and the first data instance 122b may be a text filed named "Test.txt."

The second cloud provider cloud 106 and the third cloud provider cloud 108 may respectively include/be associated with second cloud storage resources 128 and third cloud storage resources 130. The second cloud storage resources 128 and the third cloud storage resources 130 may respectively store second data instances (not depicted in FIG. 1A) and third data instances (not depicted in FIG. 1A). The second cloud storage resources 128 and the third cloud storage resources 130 may be similar to the first cloud storage resource 120. In one aspect, the first cloud storage resource 120 is an object-based storage resource and the second cloud storage resources 128 are hierarchical based storage resources.

The on-premises computing device 102 includes on-premises storage 132. The on-premises storage 132 may include computer-accessible storage, such as in-memory caches, SSDs, HDDs, tape drives, etc. The memory 144 of the on-premises computing device 102 includes a migrator 134 (i.e., machine executable instructions) that, when executed by the processing device 112, cause cloud storages resources (e.g., the first cloud storage resource 120) to be migrated to the on-premises storage 132. Different aspects of the migration are discussed in greater below.

In one aspect, the migrator 134 is configured to obtain cloud storage resources (e.g., the first cloud storage resource 120, the second cloud storage resources 128, the third cloud storage resources 130, etc.) from the different cloud storage providers, migrate the cloud storage resources into an organized and structured physical file system (e.g., with persistence, fault tolerance, and redundancy, such as via a redundant array of independent disks (RAID)) and/or a virtual file system (e.g., an abstraction overlaid upon the physical file system) that mimics locations/regions of the cloud storage resources with certain adjustments. Migrating the cloud storage resources may include receiving the cloud storage resources over the network 110 from one or more cloud provider clouds and generating the organized and structured physical file system and/or the virtual file system. For example, as part of migration, the migrator 134 creates an on-premises file structure 136 that stores migrated cloud storage resources 138 corresponding to the cloud storage resources. The on-premises file structure 136 may correctly distribute contents (e.g., data instances) of the cloud storage resources in the on-premises storage 132. The on-premises file structure 136 may be consistent with a topology of cloud storage provider(s) (e.g., the first cloud provider cloud 104). The on-premises file structure 136 may provide for both a logical separation and a physical separation of services and data in the on-premises storage 132. For instance, on-premises file structure 136 may combine cloud storage provider identifiers, geographic region identifiers, and cloud storage resource identifiers into logical blocks that provide for greater deployment opportunities for infrastructure layouts while at the same time ensuring integrity of data instances stored in the cloud storage resources.

An example of a migration performed by the migrator 134 is now set forth. Although the example refers to cloud storage resources (e.g., the first cloud storage resource 120 and the Pth cloud storage resource 126) as buckets and data instances (e.g., the first data instance 122a, the first data instance 122b) as objects, it is to be understood that the concepts presented in the example are applicable to other types of cloud storage resources (e.g., blobs) and data instances. Furthermore, although the example below focuses on migrating buckets and objects stored in the buckets from a single cloud storage provider, it is to be understood that the concepts presented in the example are applicable to migrating cloud storage resources and data instances from more than one cloud storage provider. The migrator 134 may perform the example via the following pseudocode:

For each of the buckets received as input:
  Through the available API obtain the list of objects inside the bucket (geographic region-based)
  Obtain the region/location origin
    If the bucket is multiregional, take note of the regions and bucket name and cloud vendor name
    Create a folder with the cloud provider name
      If folder already exists, proceed
    For each of the geographic regions:
      If folder does not exist:
        Create a folder named as the origin geographic region inside the vendor folder
        Create a folder inside the region folder named with the bucket name
          If the folder already exists, skip and proceed
        Migrate the highest priority labeled data into the folder representing the bucket
        For all other data, start syncing the data for the next priority label
      Else:
        Check if a folder with the bucket name already exists
        If folder exists:
        Copy the bucket content into the folder (e.g., based on priority label) for each file
        If a file with that name in the folder already exists:
        Advance the file name with a number as suffix, such as file-1.txt, if file.txt already exists.
        If not, copy file
        Else
        Create a folder inside the region folder, named as the bucket name
        Copy the bucket content into the folder for each file (e.g., based on priority level).

Based on the pseudocode listed above, the migrator 134 may generate the on-premises file structure 136. The on-premises file structure 136 may include a provider folder 140. In an example, the provider folder 140 is assigned to the first cloud provider cloud 104. The provider folder 140 may include an identifier for the first cloud provider cloud 104 (e.g., "CloudProvider"). The provider folder 140 includes a first geographic region folder 142 corresponding to the first geographic region 116. The first geographic region folder 142 may include an identifier for the first geographic region 116 (e.g., "EU-Central"). The first geographic region folder 142 includes a first cloud storage resource folder 144a corresponding to the first cloud storage resource 120. The first cloud storage resource folder 144a may include an identifier for the first cloud storage resource 120 (e.g., "Test"). The first cloud storage resource folder 144a includes a first migrated data instance 148a (e.g., "Text.txt") corresponding to the first data instance 122a. As such, a full path for the first migrated data instance 148a may be "CloudProvider/EU-Central/Test/Test.txt." The provider folder 140 includes a second geographic region folder 150 corresponding to the second geographic region 118. The second geographic region folder 150 may include an identifier for the second geographic region 118 (e.g., "EU-West"). The second geographic region folder 150 includes a first cloud storage resource folder 144b, where the first cloud storage resource folder 144b is an instance of the first cloud storage resource folder 144a. The first cloud storage resource folder 144b may include the identifier for the first cloud storage resource 120 (e.g., "Test"). The first cloud storage resource folder 144b includes a first migrated data instance 148b (e.g., "Test1.txt") corresponding to the first data instance 122a. As such, a full path for the first migrated data instance 148b may be "CloudProvider/EU-West/Test/Test1.txt." The first cloud storage resource folder 144b further includes a first migrated data instance 148c (e.g., "Test.txt") corresponding to the first data instance 122b. As such, a full path for the first migrated data instance 148b may be "CloudProvider/EU-West/Test/Test.txt." The migrator 134 may migrate other cloud storage resources (e.g., the Pth cloud storage resource 126, the second cloud storage resources 128, the third cloud storage resources 130, etc.) in a manner similar to that described above for the first cloud storage resource 120.

In one aspect, the migrator 134 may identify a number of data instances within a cloud storage resource. For instance, the migrator 134 may identify that the first cloud storage resource 120 includes two data instances. After migrating the first cloud storage resource 120 to the on-premises storage 132, the migrator 134 may perform an integrity check by comparing the number of identified data instances with a number of data instances in the provider folder 140. If the number of identified data instances and the number of data instances in the provider folder 140 are equal, the migrator 134 may confirm that the migration has been successful. If the number of identified data instance and the number of data instances in the provider folder 140 are not equal, the migrator 134 may throw an error.

In one aspect, the migrator 134 may preserve or mimic encryption of a cloud storage resource or a data instance when transferring the cloud storage resource or the data instance to the on-premises storage 132. In an example, a key used to encrypt the first cloud storage resource 120 (or the first data instance 122a or the first data instance 122b) is associated with an account that owns the first cloud storage resource 120; however, when the first cloud storage resource 120 is migrated, this association may no longer hold. In one aspect, a user associated with the first cloud storage resource 120 may specify an encryption that is to be used to encrypt the first cloud storage resource 120 (or the first data instance 122a or the first data instance 122b). When the first cloud storage resource 120 is migrated, the migrator 134 may automatically encrypt one or more of the provider folder 140, the first geographic region folder 142, the first cloud storage resource folder 144a, the first migrated data instance 148a, the second geographic region folder 150, the first cloud storage resource folder 144b, the first migrated data instance 148b, or the first migrated data instance 148c based on the specified encryption. In another aspect, the migrator 134 may determine the encryption used to encrypt the first cloud storage resource 120 (or the first data instance 122a or the first data instance 122b). The migrator 134 may implement the encryption on one or more of the provider folder 140, the first geographic region folder 142, the first cloud storage resource folder 144a, the first migrated data instance 148a, the second geographic region folder 150, the first cloud storage resource folder 144b, the first migrated data instance 148b, or the first migrated data instance 148c. In one aspect, the migrator 134 may implement the encryption based on a plurality of configurable properties specified by the user.

In one aspect, the migrator 134 may migrate data instances (e.g., the first data instance 122a) based on priorities assigned to or determined for the data instances. For example, the first data instance 122a may have a first priority and the first data instance 122b may have a second priority that is lower than the first priority. For instance, the first priority may be indicative of cached data that is accessed relatively frequently, whereas the second priority may be indicative of infrequently accessed data. The migrator 134 may migrate the first data instance 122a before migrating the first data instance 122b based on the first priority and the second priority. In one aspect, the priorities may be based on labels, which will be discussed in greater detail below in the description of FIG. 1B.

Figure 1B:
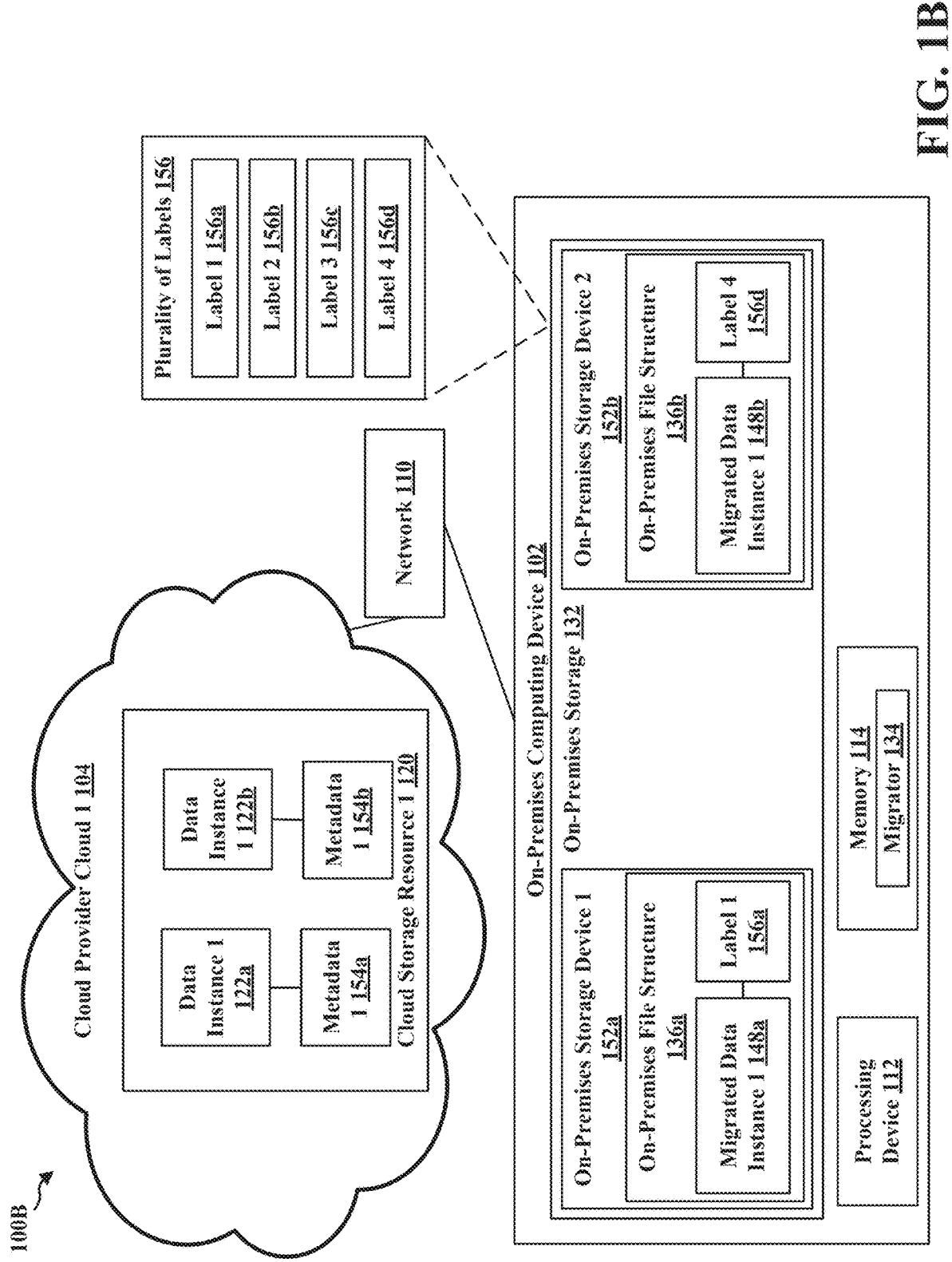
FIG. 1B is a block diagram that illustrates an example system in accordance with some aspects of the present disclosure.

FIG. 1B is a block diagram 100B that illustrates an example system in accordance with some aspects of the present disclosure. The system includes the on-premises computing device 102, the network 110, and the first cloud provider cloud 104. Although not illustrated in the block diagram 100B, the system may also include elements described above in FIG. 1A (e.g., the second cloud provider cloud 106, the third cloud provider cloud 108, etc.). The system depicted in the block diagram 100B may facilitate storing migrated cloud storage resources into storage devices with appropriate characteristics, as described in greater detail below. In one aspect, functionality of the system depicted in the block diagram 100B is performed concurrently with the functionality of the system depicted in the block diagram 100A.

The on-premises storage 132 may include a first on-premises storage device 152a that includes first characteristics. In an example, the first characteristics include one or more of a first read-time for reading data, a first write-time for writing data, or a first storage size for storing data. In an example, the first on-premises storage device 152a is or includes a first in-memory cache, a first SSD, a first HDD, or a first tape drive. The on-premises storage 132 may also include a second on-premises storage device 152b that includes second characteristics. In an example, the second characteristics include one or more of a second read-time for reading data, a second write-time for writing data, or a second storage size for storing data. The first characteristics may be different from the second characteristics. In an example, the second on-premises storage device 152b is or includes a second in-memory cache, a second SSD, a second HDD, or a second tape drive. Although the first on-premises storage device 152a and the second on-premises storage device 152b are depicted in FIG. 1B as being part of the same computing device, in some aspects, the first on-premises storage device 152a and the second on-premises storage device 152b may be included in different computing devices under control of an organization.

As noted above, prior to migration, the first cloud provider cloud 104 may store a first cloud storage resource 120, where the first cloud storage resource 120 may include a first data instance 122a and a first data instance 122b. The first data instance 122a and the first data instance 122b may be copies of one another that, prior to migration, are stored in different geographic locations. The first data instance 122a may include or be associated with first metadata 154a. The first metadata 154a may be indicative of a priority of the first data instance 122a. In an example, the first metadata 154a may include an indication of a storage class of the first data instance 122a. In an example, the storage class is based on how frequently the first data instance 122a is accessed in the first cloud provider cloud 104. In another example, the first metadata 154a may include information pertaining to how frequently the first data instance 122a is accessed. Similarly, the first data instance 122b may include or be associated with first metadata 154b. The first metadata 154b may be indicative of a priority of the first data instance 122b. In an example, the first metadata 154b may include an indication of a storage class of the first data instance 122b. In an example, the storage class is based on how frequently the first data instance 122b is accessed in the first cloud provider cloud 104. In another example, the first metadata 154b may include information pertaining to how frequently the first data instance 122b is accessed.

The migrator 134 may maintain a plurality of labels 156. Each label in the plurality of labels 156 may be indicative of a priority of a data instance. Prior to or concurrently with migrating the first data instance 122a and the first data instance 122b, the migrator 134 may determine priorities of the first data instance 122a and the first data instance 122b and assign labels to the first data instance 122a and the first data instance 122b, respectively, based on their respective determined priorities. In one aspect in which metadata of a data instance indicates a storage class of the data instance in a cloud provider cloud, the migrator 134 may map the storage class to a label in the plurality of labels 156. In another aspect, the migrator 134 may determine a priority of the data instance based on the metadata of the data instance, and the migrator 134 may assign a label in the plurality of labels 156 based on the determined priority. For instance, the migrator 134 may determine a frequency of access of the data instance based on the metadata, and the migrator 134 may assign a label in the plurality of labels 156 to the data instance based on the frequency of access. In another example, the migrator 134 may perform traffic profiling on the data instance based on the metadata, and the migrator 134 may assign a label in the plurality of labels 156 to the data instance based on the traffic profiling. The traffic profiling may include generating a graph of network traffic with respect to the data instance. In one aspect, the migrator 134 may utilize a computer-implemented machine learning model to classify the data instance based on the metadata and/or the data instance itself, and the migrator 134 may assign a label in the plurality of labels 156 to the data instance based on the traffic profiling.

In an example, the plurality of labels 156 includes a first label 156a, a second label 156b, a third label 156c, and a fourth label 156d. In one aspect, the first label 156a may be indicative of a standard priority, the second label 156b may be indicative of an infrequent priority, the third label 156c may be indicative of a cold priority, and the fourth label 156d may be indicative of an archive priority. In such an aspect, the migrator 134 may store a data instance in a particular type of on-premises storage device (e.g., the first on-premises storage device 152a or the second on-premises storage device 152b) based on one of the first label 156a, the second label 156b, the third label 156c, or the fourth label 156d assigned to the data instance. In another aspect, the first label 156a may be indicative of high priority data (i.e., a first priority) that is to be stored in an in-memory cache, the second label 156b may be indicative of regular priority data (i.e., a second priority) that is to be stored in an SSD, the third label 156c may be indicative of irregular priority data (i.e., a third priority) that is to be stored in an HDD, and the fourth label 156d may be indicative of low priority data (i.e., a fourth priority) that is to be stored in a tape drive. Although the description above focuses on four labels, it is to be understood that the plurality of labels 156 may include at least two labels (e.g., two labels, three labels, six labels, etc.).

In an example, the migrator 134 determines (e.g., before or during migration) that the first data instance 122a has a first priority based on the first metadata 154a (and/or based on the first data instance 122a itself). The migrator 134 then assigns the first label 156a to the first data instance 122a. During migration, the migrator 134 receives the first data instance 122a over the network 110 and stores the first data instance 122a on the first on-premises storage device 152a in the on-premises file structure 136a as the first migrated data instance 148a. The migrator 134 determines (e.g., before or during migration) that the first data instance 122b has a fourth priority based on the first metadata 154b (and/or based on the first data instance 122b itself). The migrator 134 then assigns the fourth label 156d to the first data instance 122b. During migration, the migrator 134 receives the first data instance 122b over the network 110 and stores the first data instance 122b on the second on-premises storage device 152b in the on-premises file structure 136b as the first migrated data instance 148b. In this manner, the migrator 134 may mirror storage classes of the first data instance 122a and the first data instance 122b such that the first data instance 122a and the first data instance 122b may be accessed in the on-premises storage 132 in a manner similar to that of the first cloud provider cloud 104.

In one aspect, the on-premises file structure 136a and the on-premises file structure 136b are identical to one another, but for being implemented on different types of on-premises storage devices. This may enable data instances stored in the on-premises storage 132 to be easily transferred between different types of on-premises storage devices. For example, subsequent to or concurrently with performing a migration, the migrator 134 may monitor read and write events with respect to the first migrated data instance 148a. For instance, after the first data instance 122a is migrated, migration of other data instances may entail read and write events with respect to the first migrated data instance 148a. In one aspect, the migrator 134 may utilize an extended Berkley Packet Filtering (eBPF) tool (e.g., "rwsnoop") to monitor the read and write events with respect to the first migrated data instance 148a. Extended Berkley Packet filtering may refer to technology that can run programs in a privileged context such as the operating system kernel. In one aspect, the eBPF tool may measure read and writes with respect to the first migrated data instance 148a at the application level. The migrator 134 may also monitor a storage class of the first migrated data instance 148a. For instance, the migrator 134 may monitor the first label 156a assigned to the first migrated data instance 148a. The migrator 134 may monitor the first migrated data instance 148a and the first label 156a assigned to the first migrated data instance 148a for a period of time (e.g., ten minutes). The migrator 134 may sum a number of read and writes with respect to the first migrated data instance 148a over the time period. The migrator 134 may store the sum in a data structure. The migrator 134 may compute sums and store the sums in the data structure for a predefined number of times. For instance, each time data instances are transferred from the first cloud provider cloud 104, the migrator 134 may compute a sum and store the sum in the data structure.

The migrator 134 may compute a representative value (e.g., an average) based on the sums in the data structure. The migrator 134 may move the first migrated data instance 148a to a different type of on-premises storage device (which implements the on-premises file structure 136) based on the representative value. For example, if the representative value is above a first threshold, the migrator 134 may assign a different label to the first migrated data instance 148a and move the first migrated data instance 148a to an on-premises storage device that includes faster read/write times compared to the first on-premises storage device 152a based on the different label. In another example, if the representative value is below a second threshold, the migrator 134 may assign a different label to the first migrated data instance 148a and move the first migrated data instance 148a to an on-premises storage device that includes slower read/write times compared to the first on-premises storage device 152a based on the different label. Furthermore, the migrator 134 may move the first migrated data instance 148a to a different on-premises storage device during migration of other data instances of the first cloud provider cloud 104. Thus, by dynamically moving the first migrated data instance 148a to different types of on-premises storage devices based on the read and write events occurring during migration, the migrator 134 may reduce a time (i.e., reduce processor clock cycles) to complete a full migration. Furthermore, by dynamically moving the first migrated data instance 148a to different types of on-premises storage devices based on the read and write events occurring after migration, the migrator 134 may enable the first migrated data instance 148a to be accessed in a manner that optimizes storage resources of the on-premises computing device 102.

Although the description above focuses on a first on-premises storage device 152a and a second on-premises storage device 152b, it is to be understood that the concepts discussed above may be applicable to different numbers and/or different types of storage devices. Furthermore, although the description above focuses on data instances from a single cloud provider cloud (the first cloud provider cloud 104), the concepts described above may also be applicable to data instances from different cloud provider clouds (e.g., the second cloud provider cloud 106, the third cloud provider cloud 108, etc.). Additionally, although the description above focuses on assigning labels (indicative of priorities) at a data instance level, the concepts described above may also be used to assign labels at a cloud storage resource level as well. For instance, the migrator 134 may assign a label in the plurality of labels 156 to the first cloud storage resource 120 based on the first metadata 154a, the first metadata 154b, or other metadata for the first cloud storage resource 120. The migrator 134 may store the first cloud storage resource 120 (including the first data instance 122a and the first data instance 122b) in an on-premises storage device (e.g., the first on-premises storage device 152a, the second on-premises storage device 152b, etc.) based on the label.

Figure 1C:
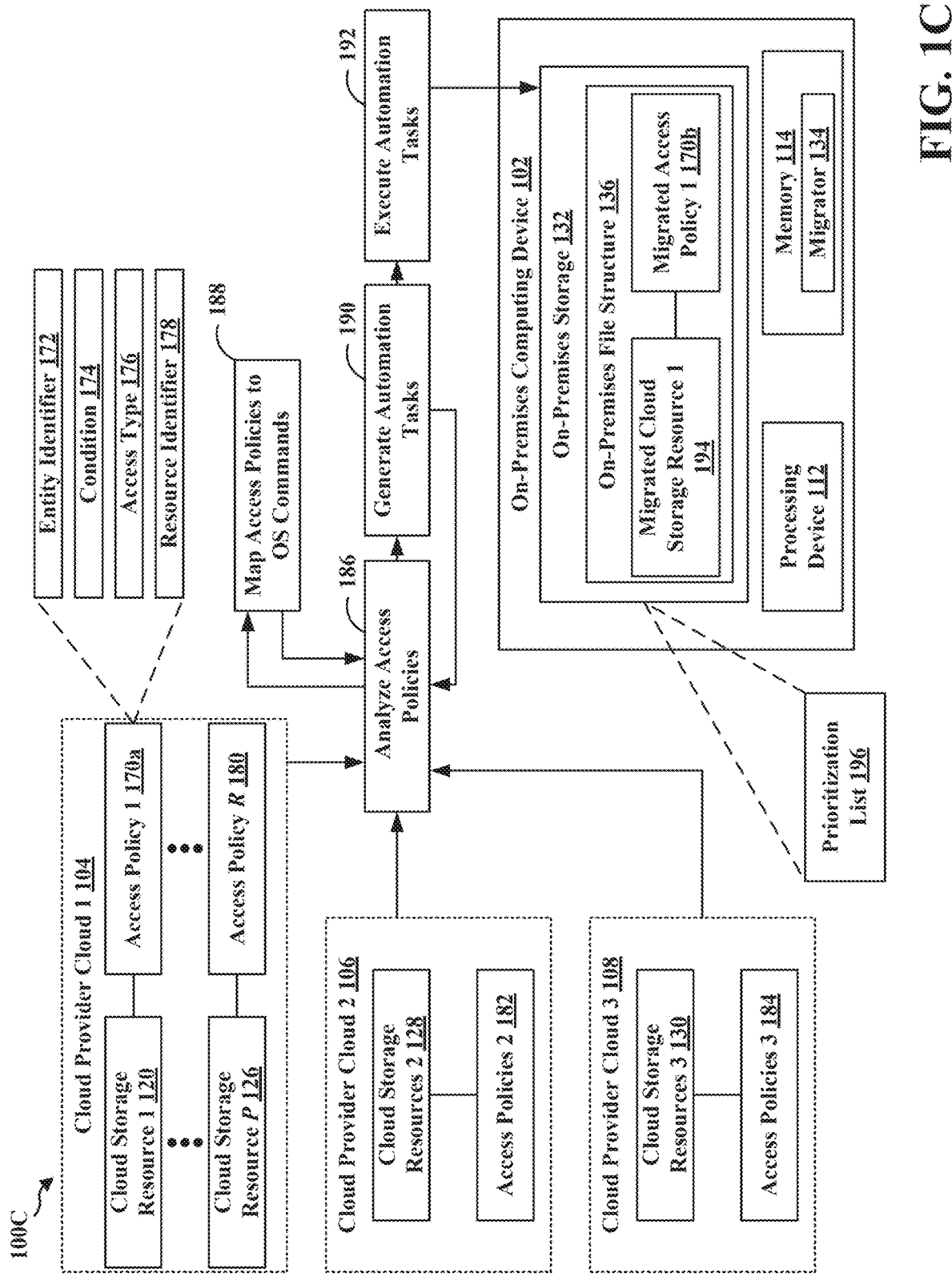
FIG. 1C is a block diagram that illustrates an example system in accordance with some aspects of the present disclosure.

FIG. 1C is a block diagram 100C that illustrates an example system in accordance with some aspects of the present disclosure. The system includes the on-premises computing device 102, the network 110, and the first cloud provider cloud 104. The system illustrated in the block diagram 100C may be utilized subsequently or concurrently with migration of cloud storage resources to the on-premises storage 132, as described above in the description of FIG. 1A and FIG. 1B.

Prior to migration to the on-premises storage 132, access to the first cloud storage resource 120 within the first cloud provider cloud 104 may be governed by a first access policy 170a. The first access policy 170a may include an entity identifier 172, a condition 174, an access type 176, and a resource identifier 178. The entity identifier 172 may indicate one or more entities that are allowed to access the first cloud storage resource 120. The condition 174 may indicate conditions under which the one or more entities are allowed to access the first cloud storage resource 120. The access type 176 may indicate a type of access (e.g., read-only, read and write, etc.) that the one or more entities are permitted. The resource identifier 178 may be an identifier for the first cloud storage resource 120. The first access policy 170a may be based on API calls of the first cloud provider cloud 104.

Similarly, access to the Pth cloud storage resource 126 within the first cloud provider cloud 104 may be governed by an Rth access policy 180, which may be similar or different from to the first access policy 170a. For instance, the Rth access policy 180 may include an entity identifier, a condition, an access type, and a resource identifier (not depicted in FIG. 1C). The resource identifier of the Rth access policy 180 is different from the resource identifier 178 of the first cloud storage resource 120. Additionally, one or more of entity identifier, the condition, or the access type of the Rth access policy 180 may be different from the entity identifier 172, the condition 174, or the access type 176 the first cloud storage resource 120. Similarly, access to the second cloud storage resources 128 may be governed by second access policies 182 and access to the third cloud storage resources 130 may be governed by third access policies 184. The second access policies 182 and the third access policies 184 may be similar to the first access policy 170a.

The migrator 134 obtains the first access policy 170a (or an indication thereof) from the first cloud provider cloud 104 or from the first migrated cloud storage resource 194. At 186, the migrator 134 analyzes the first access policy 170a. For instance, the migrator 134 may read the first access policy 170a. The migrator 134 may also read the on-premises file structure 136 of the migrated cloud storage resources 138.

At 188, the migrator 134 may map a plurality of access policies corresponding to the first access policy 188 to a plurality of OS commands of the on-premises storage 132. The mapping may be based on a lookup table. In one aspect, the migrator 134 may return to 186 after mapping the access policies to the OS commands and the migrator 134 may further analyze the access policies based on the mapping. At 190, the migrator 134 may generate automation tasks based on the access policies analyzed at 186 and the mapping at 188. The automation tasks may include computer executable actions that cause the access policies to be implemented in the on-premises storage 132. An automation system refers to software that automates provisioning, configuration, management, application deployment, orchestration, and other processes. For instance, an automation system may eliminate and/or simplify workflows, manage and maintain system configurations, continuously deploy complex software applications, and/or perform zero-downtime rolling software updates. In an example, an automation system may be provided with a domain-specific automation file that specifies tasks to be performed to automate a process. The automation system may convert the domain-specific automation file into a payload (e.g., an executable or a script). The automation system may then perform the tasks to automate the process based on the payload. One example of an automation system is Redhat™ Ansible™.

In one aspect, after generating the automation tasks, the migrator 134 may return to 186, and the migrator 134 may additionally analyze access policies based on the automation tasks generated at 190. At 192, the migrator 134 may execute the automation tasks. Executing the automation tasks may cause the first access policy 170a to be implemented as a first migrated access policy 170b on the on-premises computing device 102. As such, the first migrated cloud storage resource 194 (which corresponds to the first cloud storage resource 120) may be accessed by user devices based on the first migrated access policy 170b. In this manner, the first migrated cloud storage resource 194 may accessed by user devices in a manner that mirrors the first access policy 170a, thus facilitating a seamless cloud to on-premises storage migration.

An example of a migration performed by the migrator 134 is now set forth. Although the example refers to cloud storage resources (e.g., the first cloud storage resource 120) as buckets, it is to be understood that the concepts presented in the example are applicable to other types of cloud storage resources (e.g., blobs) and data instances. Furthermore, although the example below focuses on migrating buckets (and objects stored in the buckets) from a single cloud storage provider, it is to be understood that the concepts presented in the example are applicable to migrating cloud storage resources and data instances from more than one cloud storage provider. Additionally, the example below refers to an access policy as a "bucket policy," an entity identifier as a "principal," and an access type as "an action." The migrator 134 may perform the example via the following pseudocode:

- For each of the buckets received as input:
- Through an available API, obtain the bucket policies associated with the bucket
- From the bucket policy under examination isolate an action, conditions, a principal, and a resource
  - If the principal is a cloud provider principal (CPP), assume CPP is the root of the target on-premises computing device
    - If the principal is not a CPP, create a user on the on-prem computing device and check if the user exists
  - Locate a buckets folder by examining the bucket region and resource information
  - Assume a lookup table with basic mapping between API Calls and OS operations, for example, "PutObject" (i.e., an API call of a cloud provider) is mapped to a "mv" command or "touch" command of an OS operation
  - In the lookup table, each line of mappings provides a related command to add the principal reported to the group associated with the on-premises bucket folder, e.g., "sudo usermod -a -G<bucket_group> <principal>"
- With a group command, the requisite permissions are specified (e.g., for a writing operation, a reported command may be "sudo chmod g+w <bucket_folder>"

Migrator copies the commands and adds correct parameters

The migrator adds the commands to an automation system task file

Repeat for all the bucket policies

Once completed, run the automation system task file.

In one aspect, a cloud storage resource may be associated with more than one cloud provider, and as such, after migration, a migrated cloud storage resource associated with the cloud storage resource may also be associated with the more than one cloud provider. In an example, the migrated cloud storage resource may be associated with a first cloud provider and a second cloud provider, where the first cloud provider and the second cloud provider are associated with a first access policy and a second access policy, respectively. In an example, the first access policy and the second access policy may conflict with one another. For example, the first access policy may indicate first conditions under which the cloud storage resource may be accessed and the second access policy may indicate second conditions under which the cloud storage resource may be accessed, where the first conditions and the second conditions are incompatible with one another. In such an aspect, the migrator 134 may maintain a prioritization list 196 (e.g., in the on-premises storage 132). The prioritization list 196 may include identifiers for cloud providers and an order in which access policies for the cloud providers are to be resolved. In an example, the prioritization list 196 indicates that access policies of the first cloud provider are to supersede access policies of the second cloud provider. As such, the migrator 134 may implement the first access policy (as opposed to the second access policy) using the procedures described above.

Figure 2:
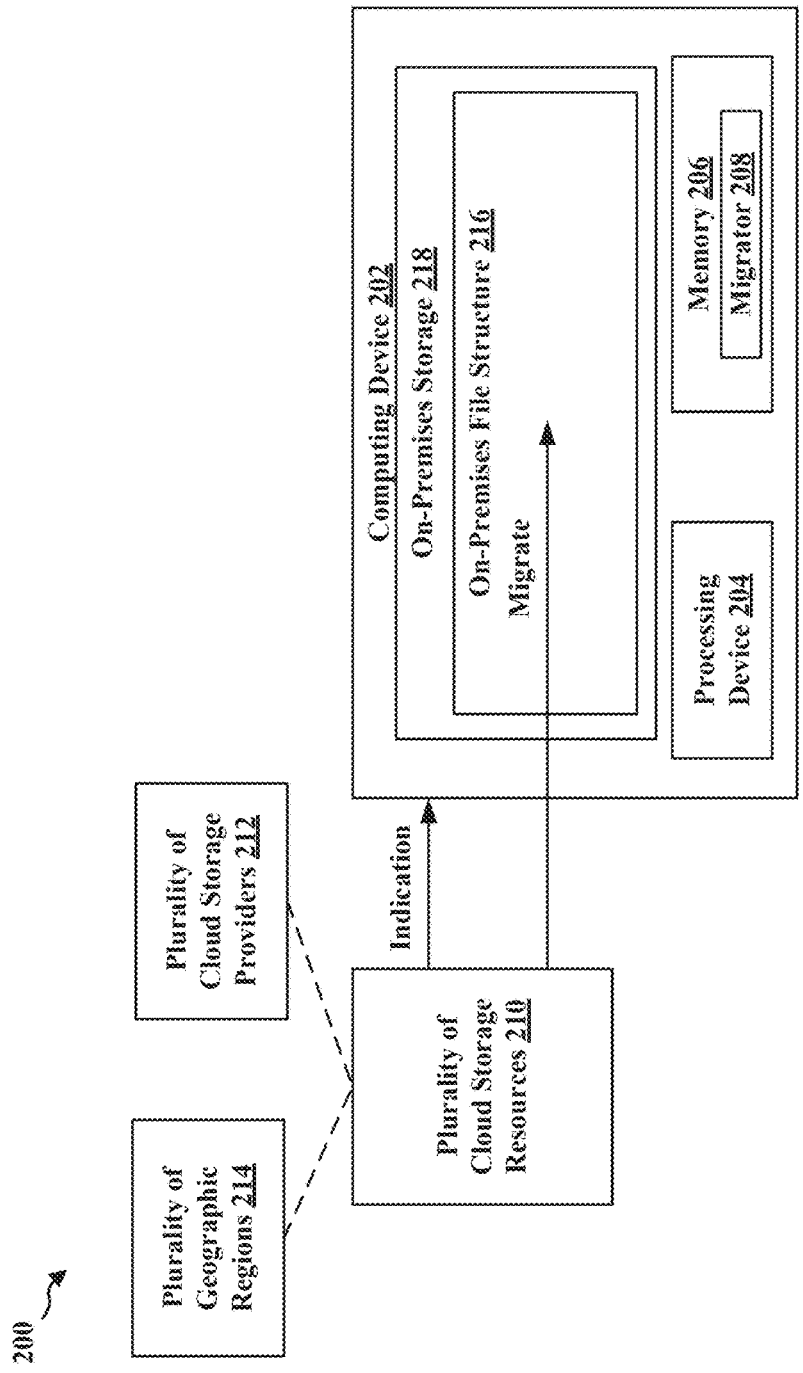
FIG. 2 is a block diagram that illustrates an example system in accordance with some aspects of the present disclosure.

FIG. 2 is a block diagram 200 that illustrates an example system in accordance with some aspects of the present disclosure. The system includes a computing device 202. The computing device 202 includes a processing device 204 and memory 206. The memory 206 includes a migrator 208 (i.e., machine executable instructions).

The migrator 208, when executed by the processing device 204, obtains in indication of a plurality of cloud storage resources 210 associated with a plurality of cloud storage providers 212 and a plurality of geographic regions 214. The migrator 208 generates an on-premises file structure 216 based on the indication of the plurality of cloud storage resources 210 and the plurality of geographic regions 214. The migrator 208 migrates the plurality of cloud storage resources 210 to on-premises storage 218 based on the on-premises file structure 216.

Figure 3:
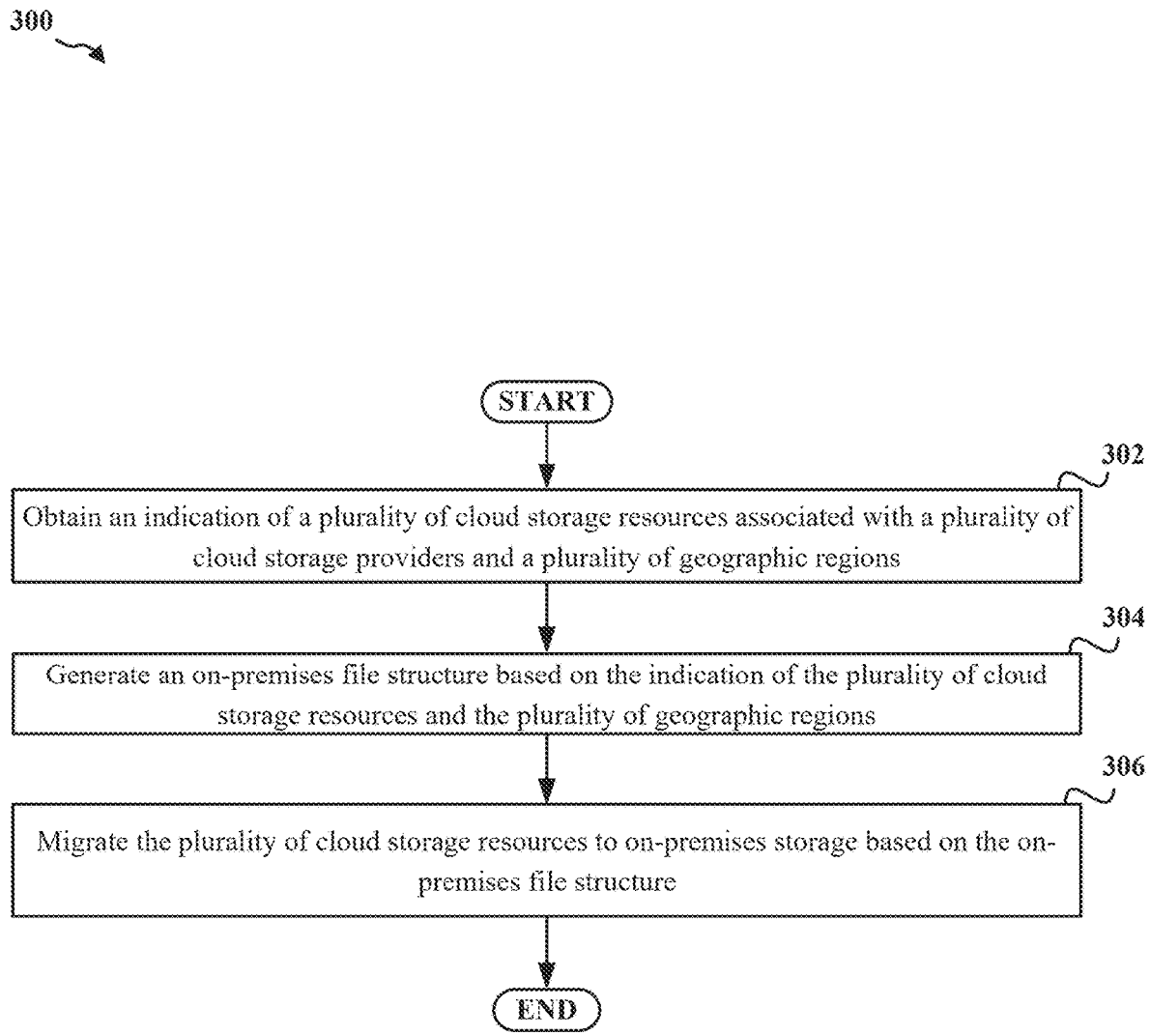
FIG. 3 is a flow diagram of a method of cloud to on-premises storage migration in accordance with some aspects of the present disclosure.

FIG. 3 is a flow diagram of a method 300 of cloud to on-premises storage migration in accordance with some aspects of the present disclosure. The method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 300 may be performed by a computing device (e.g., the on-premises computing device 102, the computing device 202). In some embodiments, the method 300 may be performed by a processing device (e.g., the processing device 112, the processing device 204). In some embodiments, the method 300 may be performed by the migrator 134 or the migrator 208.

At block 302, a processing device obtains an indication of a plurality of cloud storage resources associated with a plurality of cloud storage providers and a plurality of geographic regions. In an example, the plurality of cloud storage resources may be or include the first cloud storage resource 120, the Pth cloud storage resource 126, the second cloud storage resources 128, and/or the third cloud storage resources 130. In an example, the plurality of cloud storage providers may include or be associated with one or more of the first cloud provider cloud 104, the second cloud provider cloud 106, or the third cloud provider cloud 108. In an example, the plurality of geographic regions may include the first geographic region 116 and/or the second geographic region 118.

At block 304, the processing device generates an on-premises file structure based on the indication of the plurality of cloud storage resources and the plurality of geographic regions. In an example, the on-premises file structure may be or include the on-premises file structure 136.

At block 306, the processing device migrates the plurality of cloud storage resources to on-premises storage based on the on-premises file structure. In an example, the on-premises storage may be or include the on-premises storage 132. The (migrated) plurality of cloud storage resources may be or include the migrated cloud storage resources 138.

Figure 4:
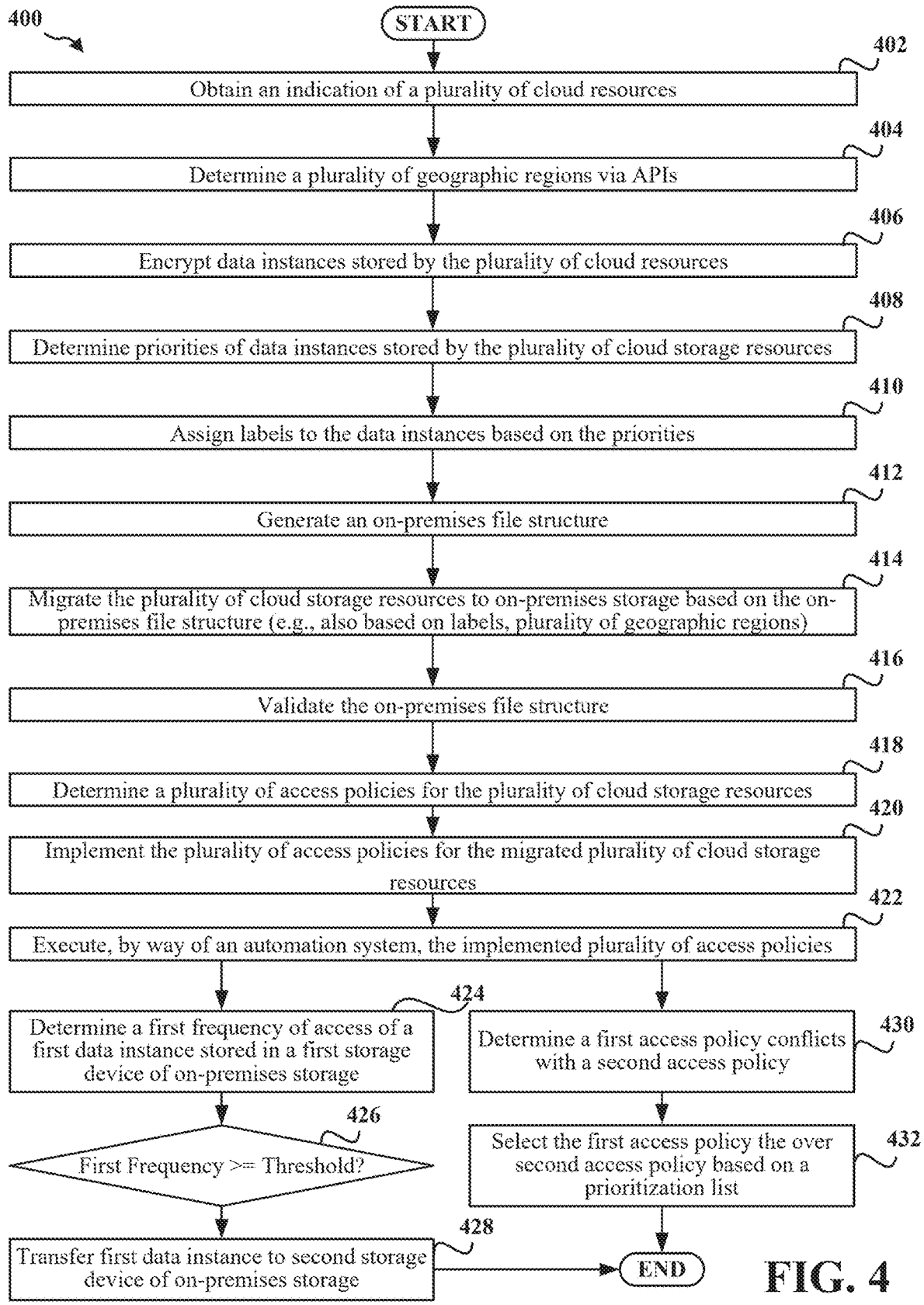
FIG. 4 is a flow diagram of a method of cloud to on-premises storage migration in accordance with some aspects of the present disclosure.

FIG. 4 is a flow diagram of a method 400 of cloud to on-premises storage migration in accordance with some aspects of the present disclosure. The method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., the on-premises computing device 102, the computing device 202). In some embodiments, the method 400 may be performed by a processing device (e.g., the processing device 112, the processing device 204). In some embodiments, the method may be performed by the migrator 134 or the migrator 208.

At block 402, a processing device obtains an indication of a plurality of cloud storage resources associated with a plurality of cloud storage providers and a plurality of geographic regions. In an example, the plurality of cloud storage resources may be or include the first cloud storage resource 120, the Pth cloud storage resource 126, the second cloud storage resources 128, and/or the third cloud storage resources 130. In an example, the plurality of cloud storage providers may include or be associated with one or more of the first cloud provider cloud 104, the second cloud provider cloud 106, or the third cloud provider cloud 108. In an example, the plurality of geographic regions may include the first geographic region 116 and/or the second geographic region 118.

In one aspect, at block 404, the processing device may determine the plurality of geographic regions via a plurality of application programming interfaces (APIs) associated with the plurality of cloud storage providers. For example, the plurality of APIs may correspond to the first cloud provider cloud 104, the second cloud provider cloud 106, and/or the third cloud provider cloud 108.

In one aspect, at block 406, the processing device may encrypt data instances stored by the plurality of cloud storage resources as the plurality of cloud storage resources is migrated based on an encryption scheme used to encrypt the data instances stored by the plurality of cloud storage resources or based on a user-specified encryption scheme. The aforementioned aspect may correspond to the description of FIG. 1A above.

In one aspect, at block 408, the processing device may determine priorities of data instances stored in the plurality of cloud storage resources. In an example, the priorities of the data instances may be based on at least one of metadata of the data instances, traffic monitoring of the data instances, packet filtering of the data instances, or a machine learning model trained to predict the priorities of the data instances. In an example, the metadata may be or include the first metadata 154*a* and/or the first metadata 154*b*. The aforementioned aspect may correspond to the description of FIG. 1B above.

At block 410, the processing device may assign, to the data instances, labels from amongst a plurality of labels based on the determined priorities. For example, the plurality of labels may be or include the plurality of labels 156. The aforementioned aspect may correspond to the description of FIG. 1B above.

At block 412, the processing device generates an on-premises file structure based on the indication of the plurality of cloud storage resources and the plurality of geographic regions. In an example, the on-premises file structure may be or include the on-premises file structure 136.

In one aspect, the on-premises file structure may include a first folder that indicates a cloud storage provider in the plurality of cloud storage providers, a second folder, within the first folder, that indicates a first geographic region in the plurality of geographic regions, and a third folder, within the first folder, that indicates a second geographic region in the plurality of geographic regions. In an example, the first folder may be the provider folder 140, the second folder may be the first geographic region folder 142, and the third folder may be the second geographic region folder 150. In one aspect, the on-premises file structure further includes a fourth folder, within the second folder, that indicates a first cloud storage resource in the plurality of cloud storage resources, where the fourth folder stores a first data instance from the first geographic region when the plurality of cloud storage resources is migrated, and a fifth folder, within the third folder, that indicates the first cloud storage resource in the plurality of cloud storage resources, where the fifth folder stores a second data instance from the first geographic region and a third data instance from the second geographic region when the plurality of cloud storage resources is migrated. In an example, the fourth folder may be the first cloud storage resource folder 144*a* and the fifth folder may be the first cloud storage resource folder 144*b*. The first data instance may be the first migrated data instance 148*a*, the second data instance may be the first migrated data instance 148*b*, and the third data instance may be the first migrated data instance 148*c*.

At block 414, the processing device migrates the plurality of cloud storage resources to on-premises storage based on the on-premises file structure. In an example, the on-premises storage may be or include the on-premises storage 132. The (migrated) plurality of cloud storage resources may be or include the migrated cloud storage resources 138.

In one aspect, at block 416, the processing device may validate, subsequent to migrating the plurality of cloud storage resources, the on-premises file structure based on a comparison of a number of files in the on-premises file structure and a number of data instances stored in the plurality of cloud storage resources. The aforementioned aspect may correspond to the description of FIG. 1A above.

In one aspect, at block 418, the processing device may determine a plurality of access policies of the plurality of cloud storage resources via a plurality of application programming interfaces (APIs) associated with the plurality of cloud storage providers. For example, the plurality of access policies may include the first access policy 170*a*. The aforementioned aspect may correspond to the description of FIG. 1C above.

In one aspect, at block 420, the processing device may implement the plurality of access policies for the migrated plurality of cloud storage resources based on the on-premises file structure. Implementing the plurality of access policies may include mapping a plurality of API calls corresponding to the plurality of access policies to a plurality of operating system (OS) commands of the on-premises storage. For example, mapping the plurality of API calls corresponding to the plurality of access policies to a plurality of operating system (OS) commands of the on-premises storage may correspond to 188 in FIG. 1C. The aforementioned aspect may correspond to the description of FIG. 1C above.

In one aspect, at block 422, the processing device may execute, by way of an automation system, the implemented plurality of access policies. The aforementioned aspect may correspond to the description of FIG. 1C above.

In one aspect, migrating the plurality of cloud storage resources to the on-premises storage may include copying a first data instance to a first storage device of the on-premises storage, where the first storage device includes first storage characteristics. For example, the first data instance may be the first data instance 122*a* and the first storage device may be the first on-premises storage device 152*a*. At block 424, the processing device may determine a first frequency of access of the first data instance stored in the first storage device. The first data instance stored in the first storage device may be the first migrated data instance 148*a*.

In one aspect, at block 426, the processing device may determine whether the first frequency of access is greater than a threshold frequency of access. The aforementioned aspect may correspond to the description of FIG. 1B above.

In one aspect, at block 428, the processing device may transfer the first data instance from the first storage device to a second storage device of the on-premises storage based on the determined first frequency of access being greater than a threshold frequency of access, where the second storage device includes second storage characteristics that are different from the first storage characteristics. For example, the second storage device may be the second on-premises storage device 152*b*. The aforementioned aspect may correspond to the description of FIG. 1B above.

In one aspect, at block 430, the processing device may determine that a first access policy in the plurality of access policies conflicts with a second access policy in the plurality of access policies, where the first access policy and the second access policy correspond to a first cloud provider in the plurality of cloud storage providers and a second cloud provider in the plurality of cloud storage providers, respectively. The aforementioned aspect may correspond to the description of FIG. 1C above.

In one aspect, at block 432, the processing device may select the first access policy over the second access policy based a prioritization list including priorities of the plurality of access policies. For example, the prioritization list may be the prioritization list 196.

Figure 5:
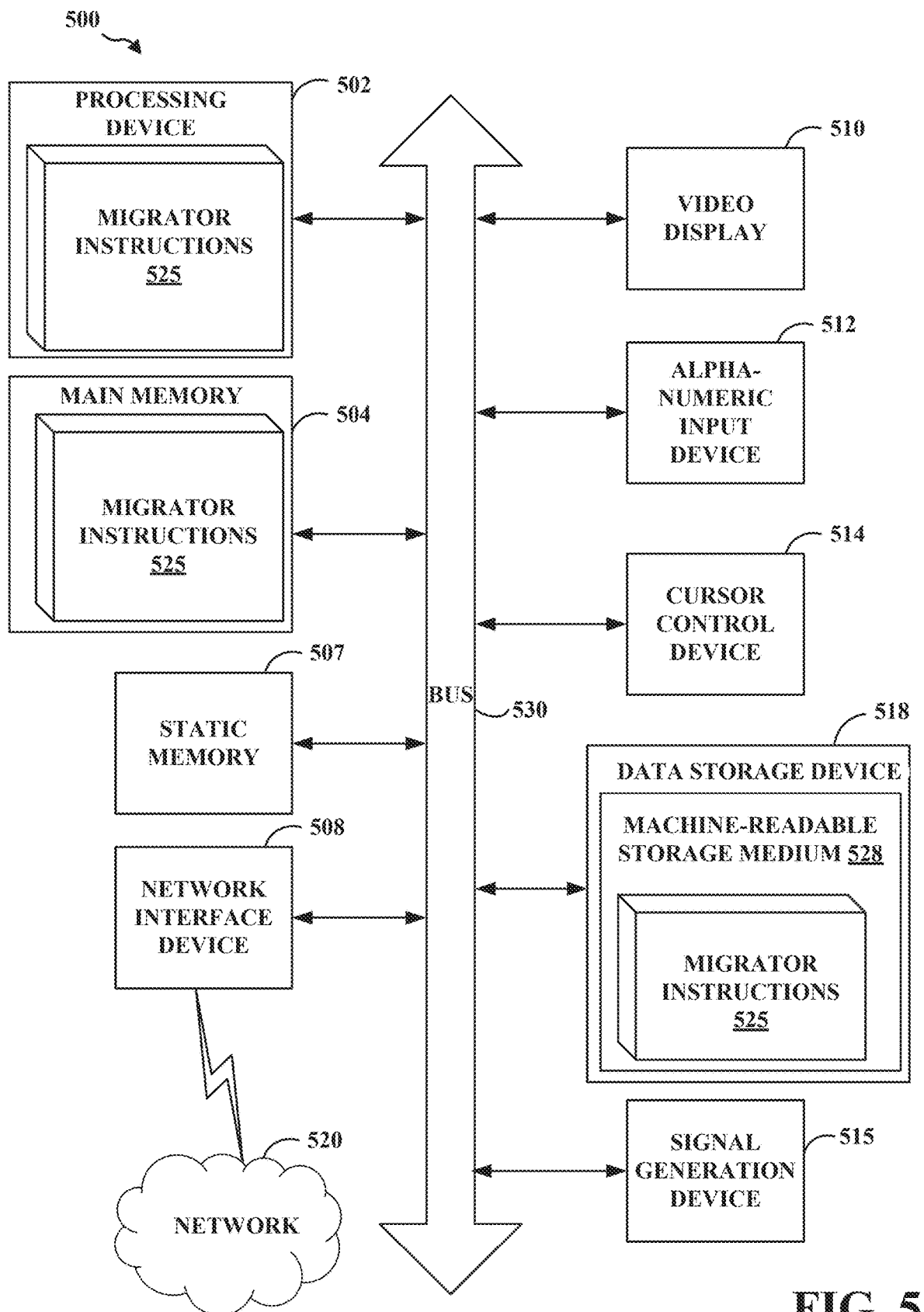
FIG. 5 is a block diagram of an example computing device that may perform one or more of the operations described herein in accordance with some aspects of the present disclosure.

FIG. 5 illustrates a diagrammatic representation of a machine in the example form of a computer system 500 within which a plurality of instructions, for causing the machine to perform any one or more of the methodologies discussed herein for cloud to on-premises storage migration. More specifically, the machine may obtain an indication of a plurality of cloud storage resources associated with a plurality of cloud storage providers and a plurality of geographic regions. The machine may generate, by a processing device, an on-premises file structure based on the indication of the plurality of cloud storage resources and the plurality of geographic regions. The machine may migrate the plurality of cloud storage resources to on-premises storage based on the on-premises file structure.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a plurality of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, the computer system 500 may be representative of a server.

The computer system 500 includes a processing device 502, a main memory 504 (e.g., read-only memory (ROM), flash memory, dynamic random access memory (DRAM), a static memory 507 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

The computer system 500 may further include a network interface device 508 which may communicate with a network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 515 (e.g., a speaker). In one example, video display unit 510, alphanumeric input device 512, and the cursor control device 514 may be combined into a single component or device (e.g., an LCD touch screen).

The processing device 502 represents one or more general-purpose processing devices such as a microprocessor, central processing unit, or the like. More particularly, the processing device 502 may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to migrator instructions 525, for performing the operations and steps discussed herein. For example, the migrator instructions 525 may include instructions for obtaining an indication of a plurality of cloud storage resources associated with a plurality of cloud storage providers and a plurality of geographic regions; generating an on-premises file structure based on the indication of the plurality of cloud storage resources and the plurality of geographic regions; and migrating the plurality of cloud storage resources to on-premises storage based on the on-premises file structure.

The data storage device 518 may include a machine-readable storage medium 528 storing (one or more sets of) migrator instructions 525 (e.g., software) embodying any one or more of the methodologies (e.g., the method described in FIG. 3 and/or the method described in FIG. 4) of functions described herein. The migrator instructions 525 may also reside, completely or at least partially, within the main memory 504 or within the processing device 502 during execution thereof by the computer system 500; the main memory 504 and the processing device 502 also constituting machine-readable storage media. The migrator instructions 525 may further be transmitted or received over the network 520 via the network interface device 508.

The machine-readable storage medium 528 may also be used to store the migrator instructions 525 to perform a method (e.g., the method described in FIG. 3 and/or the method described in FIG. 4) for migrating data from the cloud to on-premises storage, as described herein. While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation. Unless specifically stated otherwise, terms such as "receiving," "obtaining," "generating," "migrating," "determining," "encrypting," "validating," "assigning," "transferring," "implementing," "selecting," "executing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method, comprising:
    obtaining an indication of a plurality of cloud storage resources associated with a plurality of cloud storage providers and a plurality of geographic regions;
    generating, by a processing device, an on-premises file structure based on the indication of the plurality of cloud storage resources and the plurality of geographic regions; and
    migrating the plurality of cloud storage resources to on-premises storage based on the on-premises file structure.

2. The method of claim 1, further comprising:
    determining the plurality of geographic regions via a plurality of application programming interfaces (APIs) associated with the plurality of cloud storage providers, wherein generating the on-premises file structure is based on the determined plurality of geographic regions.

3. The method of claim 1, further comprising:
    encrypting data instances stored by the plurality of cloud storage resources as the plurality of cloud storage resources is migrated based on an encryption scheme used to encrypt the data instances stored by the plurality of cloud storage resources or based on a user-specified encryption scheme.

4. The method of claim 1, wherein the on-premises file structure comprises:
    a first folder that indicates a cloud storage provider in the plurality of cloud storage providers,
    a second folder, within the first folder, that indicates a first geographic region in the plurality of geographic regions, and
    a third folder, within the first folder, that indicates a second geographic region in the plurality of geographic regions.

5. The method of claim 4, wherein the on-premises file structure further comprises:
    a fourth folder, within the second folder, that indicates a first cloud storage resource in the plurality of cloud storage resources, wherein the fourth folder stores a first data instance from the first geographic region when the plurality of cloud storage resources is migrated, and
    a fifth folder, within the third folder, that indicates the first cloud storage resource in the plurality of cloud storage resources, wherein the fifth folder stores a second data instance from the first geographic region and a third data instance from the second geographic region when the plurality of cloud storage resources is migrated.

6. The method of claim 1, further comprising:
    validating, subsequent to migrating the plurality of cloud storage resources, the on-premises file structure based on a comparison of a number of files in the on-premises file structure and a number of data instances stored in the plurality of cloud storage resources.

7. The method of claim 1, further comprising:
    determining priorities of data instances stored in the plurality of cloud storage resources; and
    assigning, to the data instances, labels from amongst a plurality of labels based on the determined priorities.

8. The method of claim 7, wherein determining the priorities of the data instances is based on at least one of metadata of the data instances, traffic monitoring of the data instances, packet filtering of the data instances, or a machine learning model trained to predict the priorities of the data instances.

9. The method of claim 7, wherein migrating the plurality of cloud storage resources to the on-premises storage comprises copying the data instances to storage devices of the on-premises storage based on the assigned labels and storage characteristics of the storage devices.

10. The method of claim 7, wherein determining the priorities of the data instances stored in the plurality of cloud storage resources comprises determining frequencies of access of the data instances.

11. The method of claim 7, wherein migrating the plurality of cloud storage resources to the on-premises storage comprises copying a first data instance to a first storage device of the on-premises storage, wherein the first storage device includes first storage characteristics, the method further comprising:
  determining a first frequency of access of the first data instance stored in the first storage device; and
  transferring the first data instance from the first storage device to a second storage device of the on-premises storage based on the determined first frequency of access being greater than a threshold frequency of access, wherein the second storage device includes second storage characteristics that are different from the first storage characteristics.

12. The method of claim 1, further comprising:
  determining a plurality of access policies of the plurality of cloud storage resources via a plurality of application programming interfaces (APIs) associated with the plurality of cloud storage providers; and
  implementing the plurality of access policies for the migrated plurality of cloud storage resources based on the on-premises file structure.

13. The method of claim 12, wherein an access policy in the plurality of access policies comprises:
  an identifier for an entity that is allowed to access the plurality of cloud storage resources,
  a condition under which the entity is allowed to access the plurality of cloud storage resources,
  a type of access that is provided to the entity, and
  identifiers for the plurality of cloud storage resources.

14. The method of claim 12, wherein implementing the plurality of access policies for the migrated plurality of cloud storage resources based on the on-premises file structure comprises mapping a plurality of API calls corresponding to the plurality of access policies to a plurality of operating system (OS) commands of the on-premises storage.

15. The method of claim 12, further comprising:
  determining that a first access policy in the plurality of access policies conflicts with a second access policy in the plurality of access policies, wherein the first access policy and the second access policy correspond to a first cloud provider in the plurality of cloud storage providers and a second cloud provider in the plurality of cloud storage providers, respectively; and
  selecting the first access policy over the second access policy based a prioritization list comprising priorities of the plurality of access policies, wherein implementing the plurality of access policies comprises implementing the selected first access policy.

16. The method of claim 12, further comprising:
executing, by way of an automation system, the implemented plurality of access policies.

17. A system, comprising:
a memory; and
a processing device operatively coupled to the memory, the processing device to:
  obtain an indication of a plurality of cloud storage resources associated with a plurality of cloud storage providers and a plurality of geographic regions;
  generate an on-premises file structure based on the indication of the plurality of cloud storage resources and the plurality of geographic regions; and
  migrate the plurality of cloud storage resources to on-premises storage based on the on-premises file structure.

18. The system of claim 17, wherein the processing device is further to:
  determine priorities of data instances stored in the plurality of cloud storage resources; and
  assign, to the data instances, labels from amongst a plurality of labels based on the determined priorities, wherein to migrate the plurality of cloud storage resources to the on-premises storage, the processing device is further to copy the data instances to storage devices of the on-premises storage based on the assigned labels and storage characteristics of the storage devices.

19. A non-transitory computer-readable medium having instructions stored thereon which, when executed by a processing device, cause the processing device to:
  obtain an indication of a plurality of cloud storage resources associated with a plurality of cloud storage providers and a plurality of geographic regions;
  generate, by the processing device, an on-premises file structure based on the indication of the plurality of cloud storage resources and the plurality of geographic regions; and
  migrate the plurality of cloud storage resources to on-premises storage based on the on-premises file structure.

20. The non-transitory computer-readable medium of claim 19, wherein the instructions, when executed by the processing device, further cause the processing device to:
  determine a plurality of access policies of the plurality of cloud storage resources via a plurality of application programming interfaces (APIs) associated with the plurality of cloud storage providers; and
  implement the plurality of access policies for the migrated plurality of cloud storage resources based on the on-premises file structure.

* * * * *